Dec. 10, 1929.  M. J. HUGGINS  1,738,651
ELECTRIC CURRENT MEASURING AND INDICATING MEANS
Filed Feb. 21, 1924
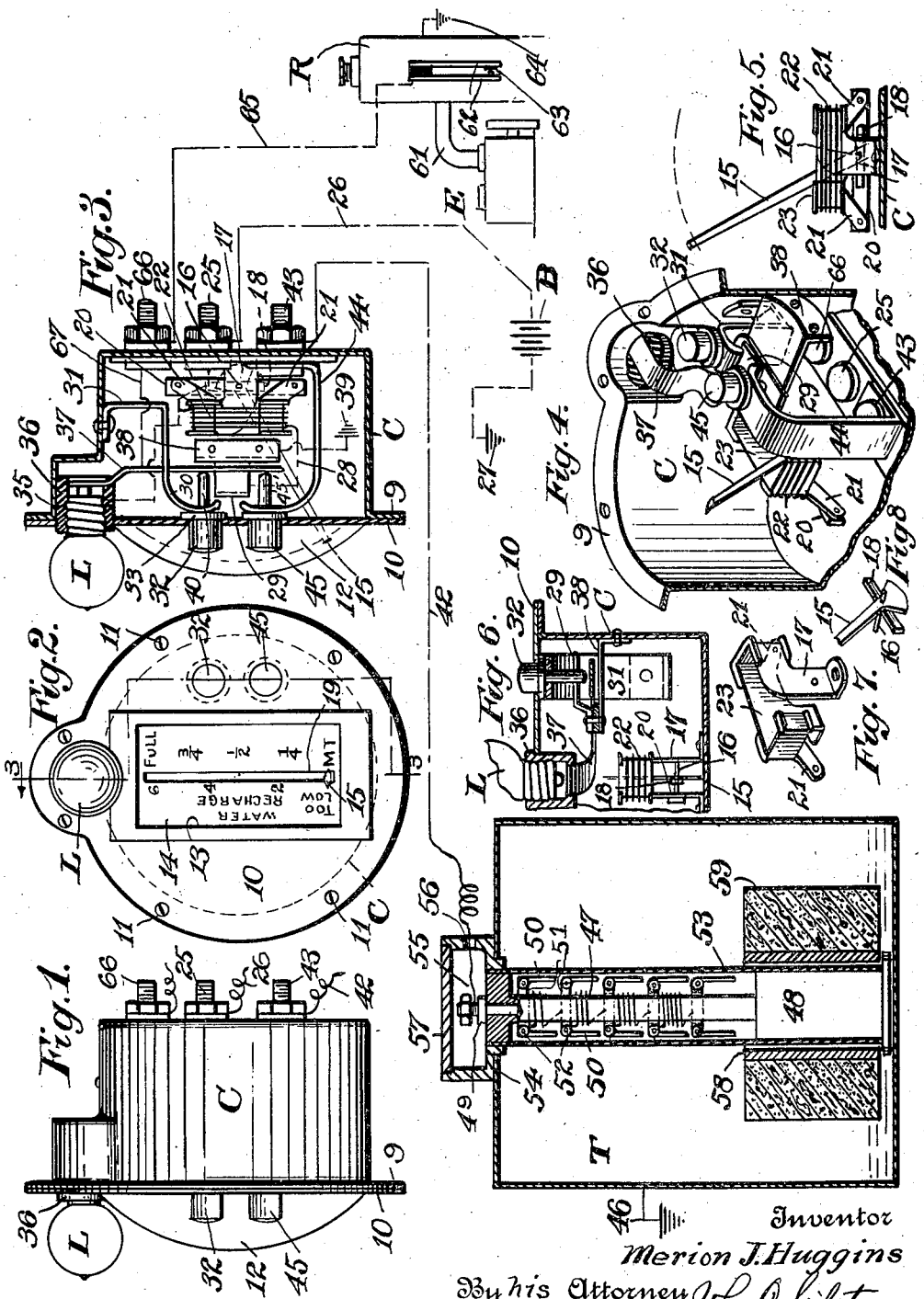
Inventor
Merion J. Huggins
By his Attorney 

Patented Dec. 10, 1929

1,738,651

UNITED STATES PATENT OFFICE

MERION J. HUGGINS, OF UPPER SADDLE RIVER, NEW JERSEY, ASSIGNOR TO AUTO-METER COMPANY, INC., OF NEW YORK, N. Y., A CORPORATION OF DELAWARE

ELECTRIC-CURRENT MEASURING AND INDICATING MEANS

Application filed February 21, 1924. Serial No. 694,223.

This invention relates to electric indicating means, and it is the primary object of the invention to provide an improved indicating instrument operable by variations in the electromotive force and strength of the current flow to indicate either the condition of a source of electric current supply or the quantity of liquid in a tank, and particularly adapted for use in motor vehicles to be mounted upon the dash or instrument board to indicate the condition of a batttey or current supply of the electrical system of the vehicle, or the quantity of gasolene in the gasolene tank, and to provide an instrument for this purpose which is novel, simple and compact in structure and efficient in use.

It is a further object of the invention to provide in connection with instruments of this character an electric lamp which is adapted to be connected in circuit with the instrument to illuminate the instrument when a reading is to be made from the instrument, and which may also serve as a "dash" light for a motor vehicle.

Another object of the invention relates to the provision of a thermo switch connected in circuit with the lamp, which switch is operative at a predetermined temperature to close the circuit for the lamp whereby the lamp will serve as a signal to indicate the thermal condition of an apparatus, such as the motive means or gasolene engine of a vehicle, the thermo switch being actuated by the heat of the cooling medium for said engine.

A still further object of the invention relates to an improved resistance device to be connected in circuit with the indicating means and operative to actuate said indicating means to indicate the quantity of liquid in a tank, and which is particularly adapted for use in connection with the gasolene storage tank of a motor vehicle to indicate the quantity of gasolene therein.

Other objects and advantages will hereinafter appear.

In the drawing accompanying and forming a part of this specification I have shown an embodiment of my invention in which Figure 1 is a side elevation of my improved electrical indicating device.

Figure 2 is a front elevation.

Figure 3 is a sectional side elevation taken substantially on the line 3—3 of Figure 2 looking in the direction of the arrows and showing in a diagrammatic manner the electrical connections of the instrument with the source of current supply, a thermo switch arranged to be effected by the cooling medium for a gasolene engine to indicate the thermal condition of the engine, and with a resistance device to indicate the quantity of liquid in a tank, said resistance device being shown in longitudinal section and arranged in a liquid carrying tank.

Figure 4 is a detail view in perspective of a portion of the arrangement of the circuit closing means to connect the source of current supply and the resistance device in circuit with the indicating means, and to connect a lamp in the circuits of said indicating means with the current supply and the resistance device to illuminate the indicating means.

Figure 5 is a detail view in side elevation of an indicator forming a part of the indicating means to show the mounting thereof and the relation of the indicator to its magnetic influencing means.

Figure 6 is a sectional detail view to illustrate the means for connecting the lamp in circuit with the source of current supply and a resistance device when they are connected in circuit with the indicating means.

Figure 7 is a perspective view of a support for the indicator and its magnetic influencing means; and Figure 8 is a perspective view of a portion of the indicator to show the pivotal support of the same and the mounting of a magnetizable element or polarized vane associated therewith and through which the indicator is influenced and moved by the magnetic means.

Similar characters of reference designate like parts throughout the different views of the drawing.

While I have shown my improved indicating means and will describe the same in connection with the electrical system of a motor vehicle and as particularly applicable to indicate the condition of a source of current supply of said system, the thermal condition of the power plant of the vehicle and the quantity of gasolene in a gasolene tank, and a lamp to illuminate the indicating means and serve as a signal it will be obvious that the same may be adapted for other uses and purposes.

The embodiment of the electrical indicating means or instrument illustrated in the drawing comprises a casing C in the form of a cup shaped member in which the operative mechanism of the indicating means is mounted and enclosed, said casing having a laterally extending annular flange 9 at the rim of the opening, and the opening being closed by a disk or plate 10 secured to the casing flange by screws 11 passing through perforations in the closure disk and threaded into the flange 9. The closure plate has an outwardly bulged portion 12 arranged in the arc of a circle having an opening or window 13 closed by a transparent material, such as glass or celluloid, and having mounted therein a dial 14 to be viewed through the window. The casing is mounted by means of the flange 9 upon a support, such as the dash or instrument board of a motor vehicle when used in connection with the electrical system of a vehicle.

An indicator or pointer 15 is fixed adjacent one end to a pivot pin 16 whereby it is pivotally supported in a bracket or frame 17 of non-magnetic material, such as brass, secured to the back of the casing, the end of the pointer being arranged as a counterweight to counter-balance the same. The pointer has associated therewith a magnetic element in the form of a polarized vane 18 fixed to the pointer or its supporting pivot. The opposite end of the pointer extends through a slot 19 in the dial and relative to which dial it is movable and has the extremity bent laterally to lie contiguous to the face of the dial. The pointer is normally moved to and maintained in position adjacent the lower end of the dial slot, as shown in Figure 5, by the directive magnetic force of a permanent magnet 20 in the form of a bar attached at opposite ends to ears 21 of the bracket 17 and in the magnetic field or flux of which magnet the polarized vane 18 is arranged to serve as an armature to said magnet.

The pointer is moved relative to the dial to indicate the condition of a source of current supply or of the current flow therefrom by a magnetic force generated by said current flow in the magnetic field or flux of which the polarized element 18 is also located, said field being adapted to counteract and move the pointer against the permanent directive force of the magnet 20. The means for generating this counteracting magnetic force comprises a coil or solenoid 22 wound about the frame 17, which frame is arranged, as at 23, to serve as a spool for the coil, the pointer or indicator 15 passing through and having movement in said spool and coil. One terminal of the coil is connected by a conductor 24 with a contact terminal 25 which is in the nature of a binding post carried by and insulated from the casing C. The binding post 25 is connected to a source of current supply, such as a battery, shown in a conventional form at B, the condition of which is to be ascertained and indicated by the indicating means, said battery being grounded, as at 27, when used in connection with a motor vehicle grounded in the vehicle frame. The other terminal of the coil may also be grounded, as in the vehicle frame, and thereby connected in circuit with the battery, but in order to conserve current the coil is connected in open circuit with the source of current supply and means are provided to connect the same in circuit therewith at will. For this purpose the other terminal of the coil is connected by a conductor 28 within the casing to a contact terminal 29, and the circuit is completed by a circuit closer in the form of a resilient member 30 secured at one end to the casing, as at 31, and whereby said contact maker is grounded, the free end lying adjacent to the contact terminal 29 and moved into contact with said terminal 29 by a push button 32 operable from the exterior of the casing, said button being slidably mounted in the casing closure 10 and normally urged to position with a shoulder 33 in engagement with the closure, and which shoulder also limits the outward movement of the button, by the inherent tension of the circuit closer 30. By pushing the button inward the coil will be connected in circuit with the battery and the current flow will establish a magnetic field the force of which acts upon the polarized vane of the indicator to pull or move the same out of the field of the permanent magnet 20 and move the same upward in the dial slot the extent of this movement depending upon the electromotive force of the current source and the magnetic field generated by the coil. The dial is arranged at the lefthand side of the dial slot with the indicia "too low" adjacent the lower end of the slot, and "water recharge" centrally between the ends, and also with the indices "2", "4" and "6", this latter indicating the voltage of the current source. Assuming the battery has a voltage capacity of six volts, should the indicator be moved to the upper end of the dial slot by the magnetic force generated by the coil it will indicate that the battery is fully charged and in good condition. Should the indicator register between the indices 2 and 4, indicative of 3 or 4 volts, respectively, and register with the indice "water recharge" it will indicate that the water in the battery is low and that the battery is not fully charged and requires to be recharged.

To illuminate the indicating instrument to facilitate the reading of the same a lamp L is mounted in a socket in the casing comprising the usual threaded terminal contact shell 35 mounted in a socket member 36 of insulator material, a member 37 of resilient conducting material being arranged with the end engaging at the end of the insulator member 36 to constitute the end contact terminal of the socket with which the end contact of the lamp is adapted to contact. The lamp is connected in an open shunt circuit with the circuit of coil 22 and source of current supply by connecting the socket shell 35 with the contact terminal 25 and the circuit completed through the resilient contact member 37 and a contact member 38 fixed to and grounded in the indicator casing, as conventionally shown at 39. The contact member 37 is normally out of contact with the terminal 38 and is moved in contact with said terminal 38 by a stem 40 connected to or integral with the button 32 as the button is moved inward to close the coil circuit through the contact members 29 and 30. It will be obvious as the button is released and the circuit for the coil opened that the lamp circuit will be simultaneously opened.

As stated the instrument is also adapted to indicate the quantity of liquid in a tank. This is accomplished by connecting a resistance device externally of the instrument into circuit with the coil 22 and the source of current supply or battery B, the variable resistance set up by the resistance device in the current flow operating to increase or decrease the magnetic force generated by the coil and thereby moving the indicator proportionately and relative to the dial and against the permanent directive force of the magnet 20. The resistance device is mounted in a liquid carrying tank T representative of the gasolene tank of a motor vehicle, connected by a conductor 42 with a contact terminal 43 in the form of a binding post carried by and insulated from the casing C, said terminal being connected through a resilient circuit closer 44, the contact terminal 29 and the conductor 28 in circuit with the coil. This circuit of the resistance device and coil is normally open and is closed by moving the bowed and free end of the contact member 44 into contact with the terminal 29 by a push button 45 similar to the button 32, slidably mounted in the casing closure 10 to be operated from the exterior of the casing. The inherent resiliency of the contact maker 44 normally maintains the button in its outermost position with said contact out of contact with the terminal 29. The circuit with the battery is completed through the coil 22, the conductor 24, casing terminal 25 and conductors 26, the resistance device being grounded through the tank, as indicated in a conventional manner at 46. The resistance device comprises a coil 47 wound about a reduced portion of a dielectric carrier 48, said carrier having enlarged portions at opposite ends with the coil arranged intermediate said enlarged ends. The coil is connected at one terminal with the conductor 42 by a contact terminal 49 in the nature of a binding post secured in the end of the dielectric carrier and electrically connected to the coil. Permanent magnets 50 arranged in pairs at diametrically opposite sides of the coil carrier, there being five pairs shown in the present instance, are connected in circuit with different sections or portions of the coil 47. These magnets are pivotally supported and electrically connected to the coil by carriers 51 of conducting material passed through the dielectric carrier in substantially equidistant spaced relation, the magnets being pivotally connected to opposite ends of said carriers, as at 52. The coil and magnets are enclosed in a tubular member or housing 53 of non-magnetizable material, such as brass, the diameter of said tube being such as to have a tight fit with the enlarged ends of the dielectric member 48. The unit formed by the tube 53 with the coil and magnets and their dielectric carrier is suspended in the tank T through an opening in the top and extends to adjacent the bottom of the tank by means of a head 54 connected to the end of the tube 53 and engaging in the tank opening and with the tank about said opening. The head has a recess 55 therein exterior of the tank in which recess is located the contact terminal 49 the conductor 42 connected thereto passing through an opening 56 in the wall of said recess. The outer end of the recess is closed by a disk 57 engaging an annular enlargement or seat in the outer end of the recess wall and removably secured therein. By this arrangement the magnets 50 will assume a position by gravity in substantially parallel relation to the dielectric carrier 48 in spaced relation to the coil and tubular housing 53. The coil is grounded through the tubular housing and the tank. Furthermore, by the arrangement described the coil and magnets are maintained out of contact with the liquid in the tank or an air space in said tank.

The magnets are connected with successive sections of the coil and the circuit is closed through different sections of the coil by the magnets and the tubular housing 53. To cause the magnets to contact with the tubular member 53 an annular member or sleeve 58 of magnetizable material, which is in the nature of an armature to the magnets, is mounted upon the tubular member to have movement longitudinally of the same. Different portions or sections of the coil through the magnets are connected into and cut out of the circuit of the coil 22 and the battery by and in accordance with the liquid level in the tank. For this purpose the magnetizable member 58 is carried by a member in the nature of a float adapted to rise and fall with the liquid level in the tank. This member in the present instance comprises an annular block of cork 59 in the opening of which the magnetizable member is mounted. As liquid is supplied to the tank the cork block will rise with the level of the liquid. Assuming the tank is filled with the float at the top the uppermost pair of magnets will be attracted toward and into contact with the tubular member 53 through the magnetic attraction of the armature 58 establishing the circuit with the conductor 42 through the coil terminal 49 cutting the coil out of circuit with said conductor. As the button 45 is pushed inward the circuit with the coil 22 and battery will be closed by the contact members 44 and 29. Simultaneously with the closing of the circuit through the terminals 44 and 29 an extended portion 45' of the button 45 will engage the contact member 37 of the lamp and move said member into contact with member 38 closing the circuit of the lamp L.

The dial at the right hand side of the slot is arranged with the indicia "MT" meaning "empty" "¼", "½", "¾" and full, indicative to what capacity the tank may be filled. If desired this calibration may be in gallons. With the float at the top of the tank as the button 45 is pushed inward and the circuit closed there would be no resistance to the current flow and the coil will generate a magnetic force sufficient to influence the polarized vane 18 to move the same out of the permanent directive force of the permanent magnet 20 and the free end of the pointer in register with the indice "full" at the upper end of the dial slot. It will be obvious that as the liquid is withdrawn from the tank and the float falls with the liquid level that a greater portion of the coil 47 and resistance will be connected into the circuit and a resultant proportionally less magnetic force will be generated by the coil 22 and move the indicator 15 correspondingly relative to the dial.

The instrument is also adapted to indicate the thermal condition of an apparatus, such for instance as the cooling medium of an internal combustion engine (designated in a general way by E) constituting the motive power to a motor vehicle. The cooling medium usually consists of water carried in a radiator, (shown in a conventional manner at R) connected in circulation with the engine by pipes 61. A thermo switch or circuit closer is suitably arranged to be influenced or affected by the temperature of the heat of the cooling medium. This circuit closure may be arranged exterior to the radiator or in an air space usually provided at the filler opening of the radiator, and comprises a pair of members 62, connected at one end with the free ends in spaced relation. These members are made of a material which is expansible at a predetermined temperature causing the contact terminals 62 carried by said members to come into contact. One of said members 61 is grounded, as shown in a conventional manner at 64, as in the material of the radiator, while the other is connected by a conductor 65 with a contact terminal 66 in the nature of a binding post carried by and insulated from the casing, the binding post being connected to contact terminal 37 of the lamp by a conductor 67. The circuit of the lamp is completed through conductor 24, terminal 25 and conductor 26 connected to the battery. While the temperature of the cooling medium of the engine is below a predetermined temperature the members 62 of the thermo switch will be maintained in spaced relation by their inherent qualities but as the temperature of the cooling medium rises above a predetermined temperature the material of the members 62 will be expanded causing the contact terminals 63 to come in contact and close the circuit of the lamp causing said lamp to light and signal or give a warning that the thermal condition of the engine is such that the continued operation would mean injury to the same.

It will be obvious that variations, modifications and changes may be made in the arrangement and construction of parts, and that portions of the invention may be used without others and come within the scope of the invention.

Having thus described my invention, I claim:

In an electric indicating system for motor vehicles, a battery, an electric indicating instrument connected in a normally open circuit with the battery and influenced by the current flow from the battery, a lamp carried by the instrument in open circuit therewith, means carried by the instrument operative to close the instrument circuit to effect actuation thereof by the current flow from the battery and indicate the condition thereof and simultaneously close the lamp circuit, and a thermostatic switch connected in open circuit with the lamp and battery operative at a predetermined temperature of the heat developed by the engine to close the lamp circuit for the purpose specified.

Signed at New York city, in the county of New York, and State of New York, this 13th day of February, 1924.

MERION J. HUGGINS.